US008717641B2

(12) United States Patent
Yap et al.

(10) Patent No.: US 8,717,641 B2
(45) Date of Patent: May 6, 2014

(54) SYSTEM AND METHOD FOR EDGE IDENTIFICATION TO POSITION COMPONENTS OF A SCANNER

(75) Inventors: Choon Hwee Yap, Singapore (SG); Lian Chye Simon Tan, Singapore (SG); Kuek Peow Lai, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 237 days.

(21) Appl. No.: 13/182,166

(22) Filed: Jul. 13, 2011

(65) Prior Publication Data
US 2013/0016404 A1    Jan. 17, 2013

(51) Int. Cl.
H04N 1/04    (2006.01)
(52) U.S. Cl.
USPC .......................................... 358/497; 358/474
(58) Field of Classification Search
None
See application file for complete search history.

(56) References Cited

U.S. PATENT DOCUMENTS

| | | | |
|---|---|---|---|
| 5,465,163 A | 11/1995 | Yoshihara et al. | |
| 5,627,585 A * | 5/1997 | Goldschmidt et al. | 348/142 |
| 5,841,549 A * | 11/1998 | Munakata | 358/296 |
| 5,895,928 A | 4/1999 | Kerschner | |
| 5,999,662 A | 12/1999 | Burt et al. | |
| 6,002,492 A * | 12/1999 | Kamon et al. | 358/450 |
| 6,147,780 A | 11/2000 | Chiang | |
| 6,331,860 B1 | 12/2001 | Knox | |
| 6,507,415 B1 * | 1/2003 | Toyoda et al. | 358/450 |
| 6,636,335 B1 | 10/2003 | Tang et al. | |
| 6,690,482 B1 * | 2/2004 | Toyoda et al. | 358/1.2 |
| 6,694,065 B2 * | 2/2004 | Kobara et al. | 382/305 |
| 6,961,145 B2 * | 11/2005 | Smith | 358/1.2 |

(Continued)

FOREIGN PATENT DOCUMENTS

| | | |
|---|---|---|
| CN | 101867678 | 10/2010 |
| EP | 0509333 | 10/1992 |

(Continued)

OTHER PUBLICATIONS

Bai, Y-W, et al., Design and Implementation of a Scanner with Stitching of Multiple Image Capture, (Research Paper), IEEE Transactions on Consumer Electronics, Nov. 200*, pp. 1501-1505, vol. 54, No. 4; http://dl.acm.org/citation.cfm?id=2279776.

(Continued)

*Primary Examiner* — Dung Tran

(57) ABSTRACT

A scanner includes a scan surface, a scan, a controller, and a positioning system. The scan surface is stationary and has a first width while the scan module has a second width substantially less than the first width. The controller is configured to automatically cause two scans of a media on the scan surface, without repositioning the media, and to automatically produce a composite image of the entire media from the two scans. The positioning system is in communication with the controller and includes an identification mechanism configured to identify an edge of a scanning area associated with the scan surface and to stop a position of the scan module at the identified edge.

8 Claims, 13 Drawing Sheets

(56) References Cited

U.S. PATENT DOCUMENTS

| | | | |
|---|---|---|---|
| 6,975,434 B1* | 12/2005 | Pilu et al. | 358/474 |
| 7,136,199 B2* | 11/2006 | Cantwell | 358/474 |
| 7,333,250 B2 | 2/2008 | Spears et al. | |
| 7,426,064 B2 | 9/2008 | Cunnigan et al. | |
| 7,529,001 B2* | 5/2009 | Takahara | 358/474 |
| 7,733,539 B2 | 6/2010 | Edwards et al. | |
| 8,223,408 B2* | 7/2012 | Lee et al. | 358/488 |
| 2002/0131092 A1 | 9/2002 | Tanaka et al. | |
| 2003/0081267 A1* | 5/2003 | Cantwell | 358/474 |
| 2003/0141443 A1* | 7/2003 | Spears et al. | 250/234 |
| 2004/0184118 A1* | 9/2004 | Sato | 358/497 |
| 2008/0024836 A1* | 1/2008 | Sundnes | 358/474 |
| 2010/0149605 A1 | 6/2010 | Kim | |
| 2010/0296130 A1* | 11/2010 | Lee et al. | 358/450 |
| 2010/0296136 A1 | 11/2010 | Lee et al. | |
| 2012/0286170 A1 | 11/2012 | Van De Peut et al. | |

FOREIGN PATENT DOCUMENTS

| | | | | |
|---|---|---|---|---|
| KR | 20060134442 | | 12/2006 | |
| WO | WO 92/07441 | * | 4/1992 | H04N 1/04 |
| WO | WO-2012146358 | | 11/2012 | |

OTHER PUBLICATIONS

Scan-n-Stitch Deluxe, (Web Page), 1 Page, Retrieved from Web Oct. 30, 2013, http://www.arcsoft.com/estore/software_title.asp?productCode=SNSD.

* cited by examiner

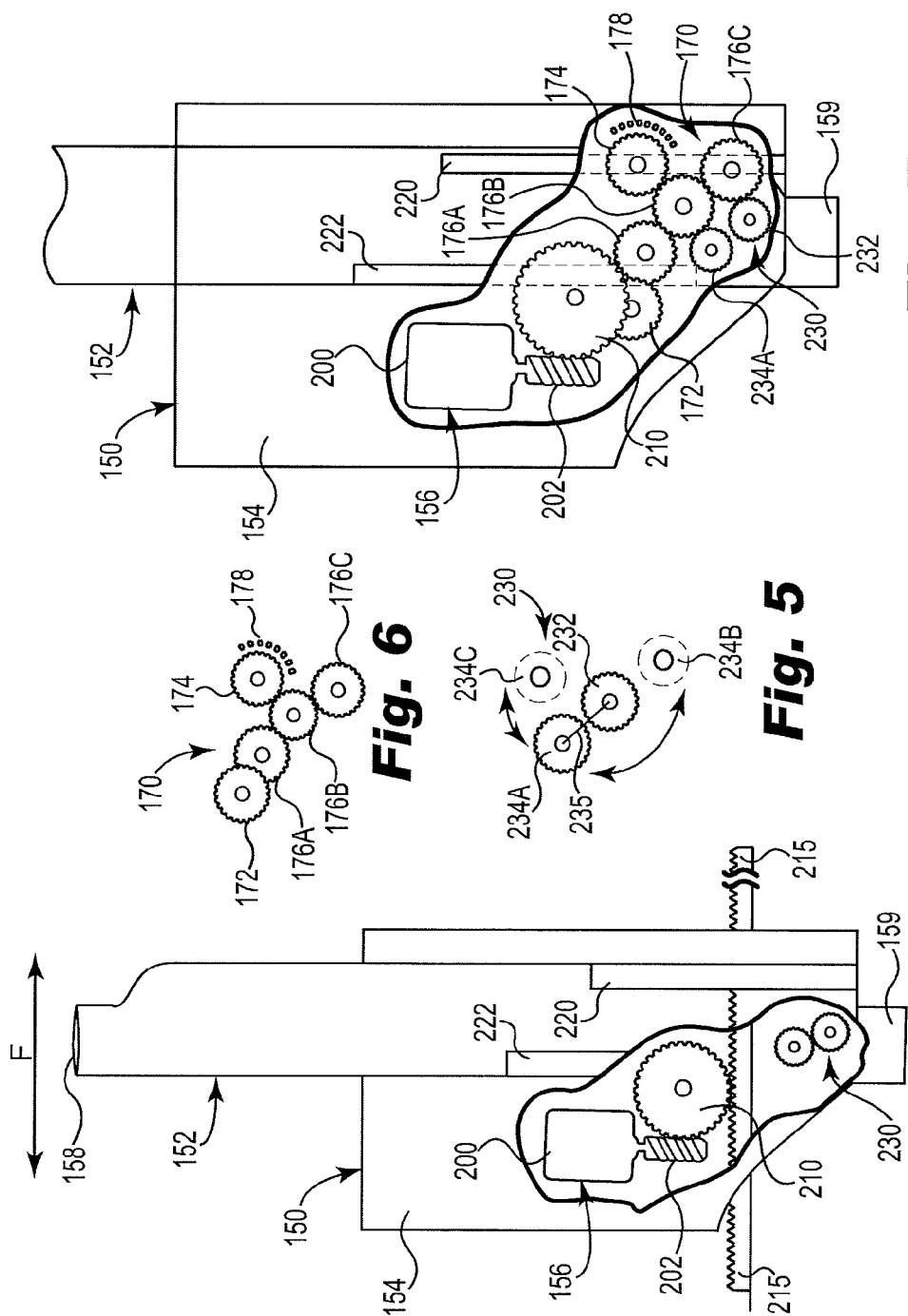

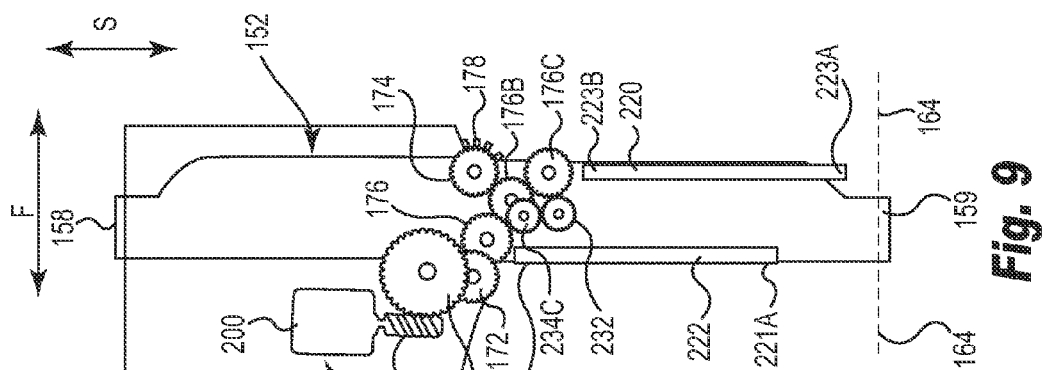
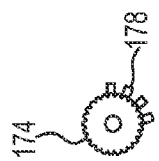
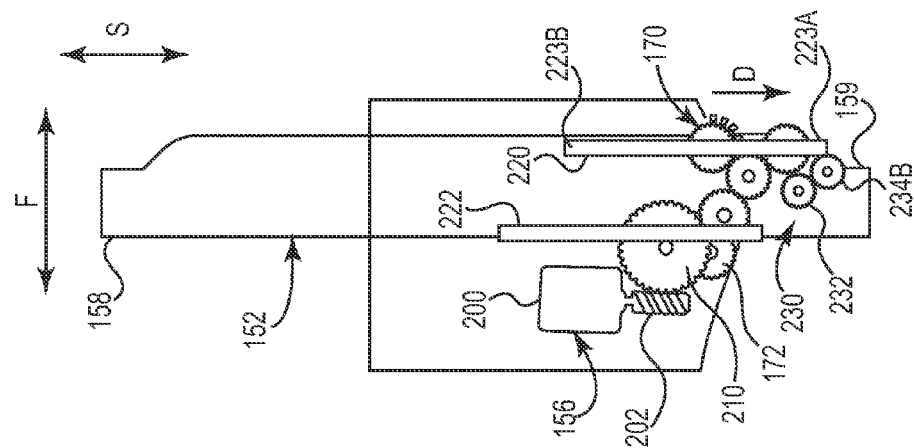

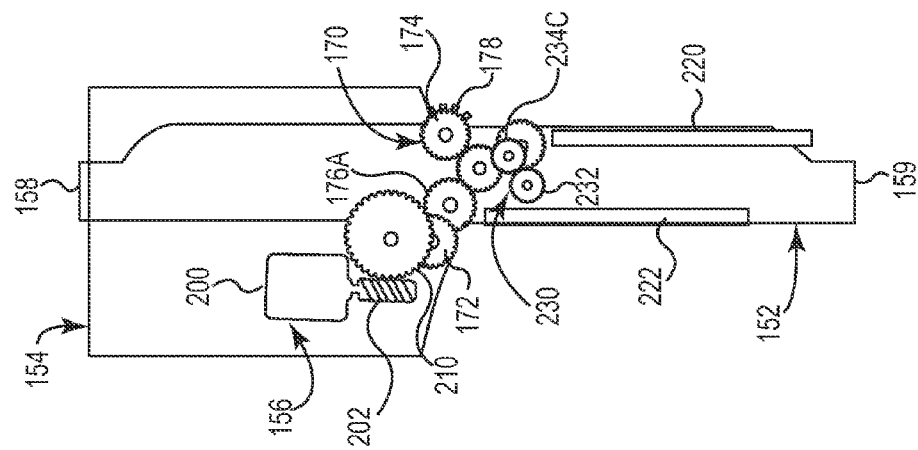
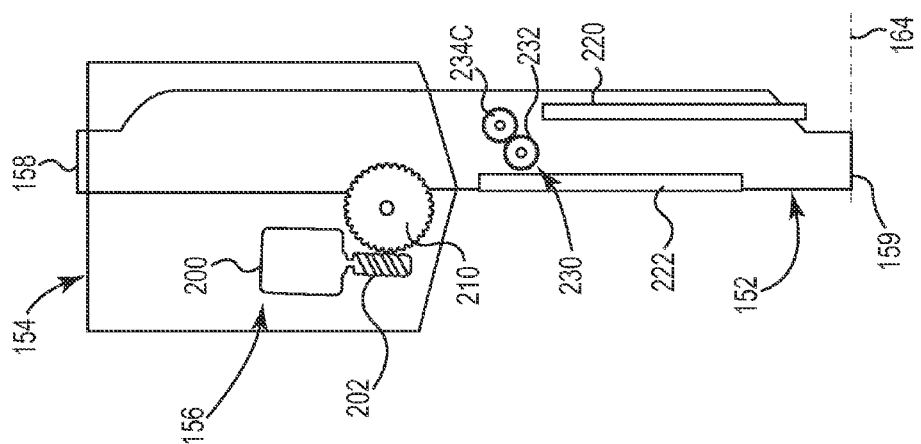

SYSTEM AND METHOD FOR EDGE IDENTIFICATION TO POSITION COMPONENTS OF A SCANNER

BACKGROUND

Many conventional scanners include a standard size scanning element having a length adapted to perform a page-wide scan of a "US letter"-sized document or an A-sized document. Some other conventional scanners include a larger sized scanning element having a width adapted to perform a page-wide scan of larger width documents, such as B sized documents. Because of the high cost of the larger sized scanning elements and/or the infrequency with which oversized documents are scanned, standard sized scanners are more common than larger sized scanners. Accordingly, some conventional standard sized scanners provide alternate ways to scan larger sized documents. In one example, one portion of a document is scanned and then after repositioning the document, the remaining portion of the document is scanned. By using the overlap between the two scanned portions, the two scanned images are stitched together upon user interaction via software to produce a single, composite image of the larger sized document.

Unfortunately, these alternate ways of scanning oversized documents typically rely on a user performing the stitching operation and also typically include a tedious user-based, re-positioning of the document during the scanning operation.

BRIEF DESCRIPTION OF THE DRAWINGS

FIG. 4 is a top plan view, with partial exposed views, schematically illustrating a scan module including a motor and gear assembly, according to an embodiment of the present disclosure.

FIG. 5 is a top plan view schematically illustrating a swing gear assembly, according to an embodiment of the present disclosure.

FIG. 6 is a top plan view schematically illustrating a gear train assembly, according to an embodiment of the present disclosure.

FIG. 7 is a top plan view, with partial exposed views, schematically illustrating a scan module including a motor and gear assembly during engaged with a gear train assembly, according to an embodiment of the present disclosure.

FIG. 8 is a top plan view schematically illustrating a scanning element of a scan module in a first position relative to a carriage element and a swing gear engaged with a first gear rail of the scanning element and with a gear train, according to an embodiment of the present disclosure.

FIG. 9 is a top plan view schematically illustrating a scanning element of a scan module in a second position relative to a carriage element and a swing gear disengaged from a first gear rail of the scanning element, according to an embodiment of the present disclosure.

FIGS. 10A and 10B are top plan views of a locking gear of a gear train in an unlocked position and a locked position, respectively, according to an embodiment of the present disclosure.

FIG. 11 is a top plan view schematically illustrating a scanning element of a scan module in a second position relative to the carriage element and a motor and gear assembly of the scan module disengaged from a gear train assembly, according to an embodiment of the present disclosure.

FIG. 12 is a top plan view schematically illustrating a scanning element of a scan module in a second position relative to a carriage element, and schematically illustrating a motor and gear assembly of the scan module engaged with a gear train of a frame, according to an embodiment of the present disclosure.

DETAILED DESCRIPTION

Figure 1A:
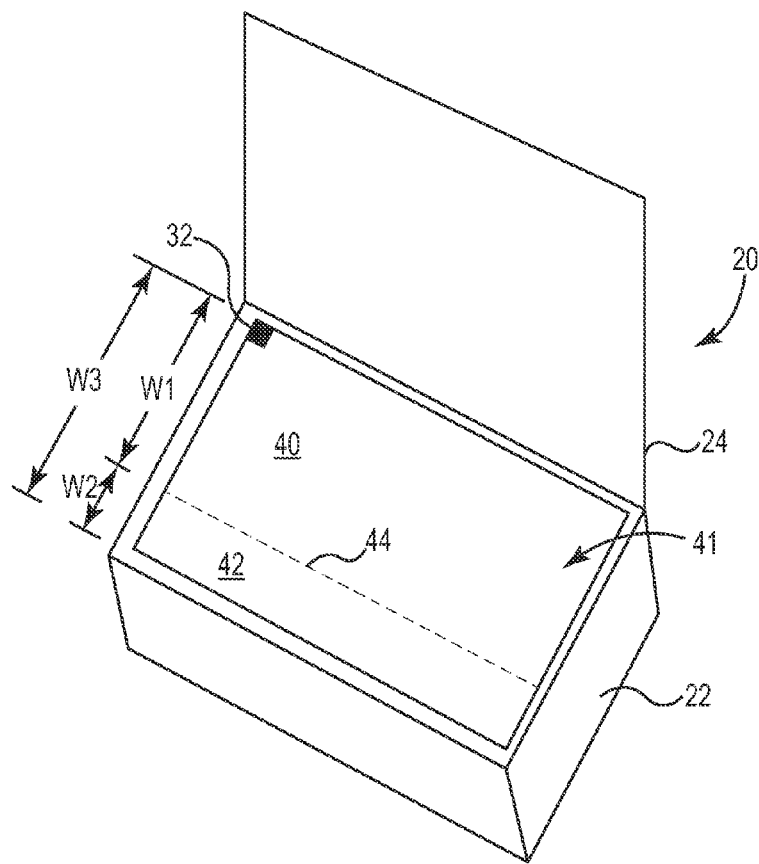
FIG. 1A is a perspective view schematically illustrating a scanner, according to an embodiment of the present disclosure.

In the following detailed description, reference is made to the accompanying drawings which form a part hereof, and in which is shown by way of illustration specific embodiments of the present disclosure that may be practiced. In this regard, directional terminology, such as "top," "bottom," "front," "back," "leading," "trailing," etc., is used with reference to the orientation of the Figure(s) being described. Because components of embodiments of the present disclosure can be positioned in a number of different orientations, the directional terminology is used for purposes of illustration and is in no way limiting. It is to be understood that other embodiments may be utilized and structural or logical changes may be made without departing from the scope of the present disclosure.

The following detailed description, therefore, is not to be taken in a limiting sense, and the scope of the present disclosure is defined by the appended claims.

Embodiments of the present disclosure are directed a system and method for automatically scanning larger sized documents using a standard size scanning element. In one embodiment, a scanner comprises a first gear assembly on a frame, a stationary scan surface having a first width, and a scan module having a length substantially less than the first width. The scan module includes a second gear assembly configured to move the scan module, in a first orientation generally perpendicular to the first width, in a first scanning path relative to a first width portion of the scan surface and in a second scanning path relative to a second width portion of the scan surface. The second gear assembly is releasably engageable to the first gear assembly to selectively shift the scan module, in a second orientation generally perpendicular to the first orientation, between the respective first and second scanning paths.

In one aspect, the images obtained from the two different scanning paths are automatically stitched together to produce a single, composite image corresponding to the larger-sized document or media residing on the scan surface. In one embodiment, this automatic stitching is performed via the scanner independent of an external computer.

In one embodiment, the second scanning path does not overlap with the first scanning path such that the first scanned portion and the second scanned portion do not include duplicative subject matter as part of their images. In one aspect, this lack of overlapping subject matter simplifies the automatic stitching together of the different first and second scanned portions. In other embodiments, the second scanning path does overlap with the first scanning path such that the first scanned portion and the second scanned portion include duplicative subject matter as part of their images, which is addressed during stitching.

In this arrangement, an oversized document or media such as a B-sized document is placed on a B-sized scan surface and then automatically scanned with an A-sized scanning element in two scanning passes without repositioning the document on the scan surface.

Moreover, because the media or document is not repositioned during scanning, the system is capable of automatically performing the stitching of the two scanned images rather than a conventional technique in which a user performs the stitching via software.

In one embodiment, a first width of the scan surface corresponds to a width of a B-sized document, such as about 11 inches and the length of the scanning element is about 8½ inches, which corresponds to the width of a standard size document (such as US Letter or A4). It will be understood that in other embodiments, a scan surface can have a different width and the scanning element can have a different length provided that the width of the scan surface is at least greater than the length of the scanning element. In one embodiment, as noted above, the width of the scan surface is substantially greater than the length of the scanning element.

Embodiments of the present disclosure also are directed to controlling a position of a scan module relative a scan surface. In one embodiment, a method controls a range of motion of a scanning element of the scan module during laterally shifting of the scanning element between two scanning paths. The method monitors a magnitude of a power signal from a motor used to cause the lateral shifting. In this arrangement, no sensors are deployed at the boundaries defining the target range of motion through which the scanning element is controlled and instead, the end of the range-of-motion via identifying a substantial change in a magnitude of the power signal that is correlated to a disengagement of a swing gear relative to a gear rail of the scanning element.

In another embodiment, at start-up of the scanner or during a position recovery mode, the scan module is delivered to a home position that omits a hard wall feature that would otherwise physically establish the home position. In one embodiment, recovering control over a position of the scan module employs a combination of these embodiments.

These embodiments, and additional embodiments, are described and illustrated in association with FIGS. 1A-22.

FIG. 1A is a perspective view of a scanner 20, according to an embodiment of the present disclosure. As shown in FIG. 1A, scanner 20 includes a body 22 and lid 24 with body 22 supporting a stationary scan surface 41. In one aspect, marker 32 identifies a position at which a corner of each document is oriented. In another aspect, body 22 contains a movable scanning element as further described below in association with FIGS. 1B-14. As further shown in FIG. 1A, scan surface 41 includes a first portion 40 and second portion 42 (their border represented by dashed line 44), with the first portion 40 having a first width W1 and with the second portion 42 having a second width W2. In one aspect, first portion 40 of scan surface 41 represents a size of a standard document (e.g., a US letter or A-sized document) such that the first width W1 is about 8 to 8½ inches. Together, first portion 40 and second portion 42 define a third width (W3) represent an oversized or large sized document (e.g. a B sized document) having a width that is substantially greater than the first width (W1) of first portion 40.

It will be understood that the identification of the first portion 40 and the second portion 42 of scan surface 41 do not correspond to physically separate components, but rather first portion 40 designates the area occupied by a standard document and second portion 42 designates the additional width occupied by an oversized document. It will be further understood that in some embodiments, first portion 40 has a smaller width (than the standard page-wide width of 8½ inches) provided that a corresponding increased width in the second portion 42 does not exceed the length of the scanning element.

Figure 1B:
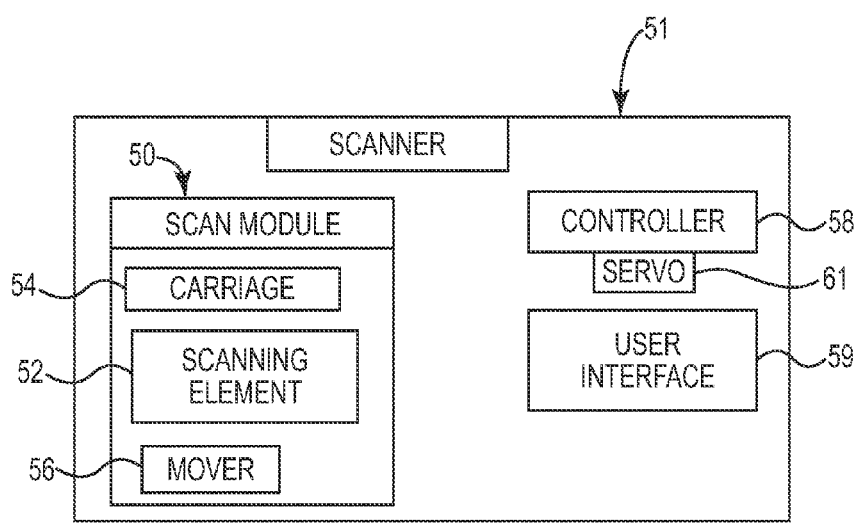
FIG. 1B is a block diagram of a scanner, according to an embodiment of the present disclosure.

FIG. 1B is a block diagram of a scanner 51, according to an embodiment of the present disclosure. The scanner 51 comprises at least substantially the same features and attributes as scanner 20 of FIG. 1A. As shown in FIG. 1B, scanner 51 includes scan module 50, controller 58, and user interface 59. The scan module 50 includes carriage 54, scanning element 52, and mover 56. The carriage 54 carries scanning element 52 and guides scanning element 52, in cooperation with mover 56, in scanning paths relative to a stationary scan surface (e.g. scan surface 30 in FIG. 1A). The mover 56 includes at least a motor and gear assembly associated with the carriage 54 and includes other gear assemblies provided throughout a frame of the scanner for selective engagement with the motor and gear assembly of the mover 56.

In general terms, the controller 58 provides signals to direct the actions and movements of scan module 50, and other components of scanner 51, to position scanning element 52 into the appropriate positions and along the appropriate paths to perform a scanning operation on a media residing on the scan surface 41. In one embodiment, controller 58 includes central processing units, application specific integrated circuits ASICs, microcontrollers, or other processing elements. In one aspect, controller 58 includes a memory storing software including instructions for performing the scanning operations described herein. Examples of the functions performed via controller 58, include but are not limited to, initiating, monitoring, and terminating scanning paths for scan module 50, positioning scan module 50 relative to the scan surface without scanning, and automatically stitching together two scanned images of different portions of a media (on stationary scan surface 41 in FIG. 1A) to produce a single composite image corresponding to the original media. In one embodiment, controller 58 comprises a servo motor controller 61 that initiates call-back functions to determine a state of a sensor or signal from a component, such as a motor, and uses the feedback to determine further actions by the controller 58 in directing scanning operations and positioning operations.

In another aspect, user interface 59 includes a graphical user interface or other user interface configured to initiate and manage, via controller 58, parameters of the scanning operation.

Figure 2:
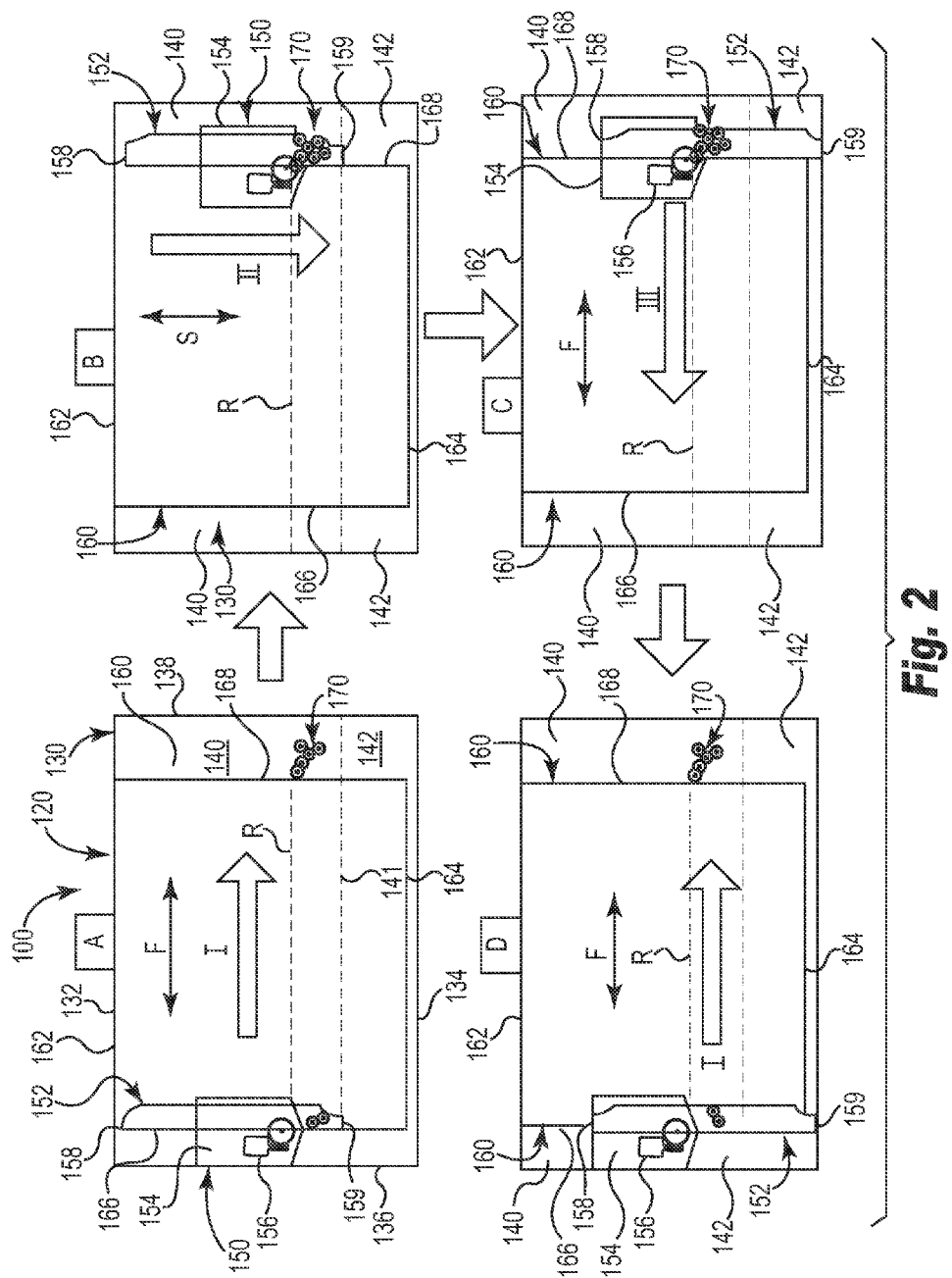
FIG. 2 is a diagram schematically illustrating a series of actions in a method and system of scanning, according to an embodiment of the present disclosure.
Figure 3:
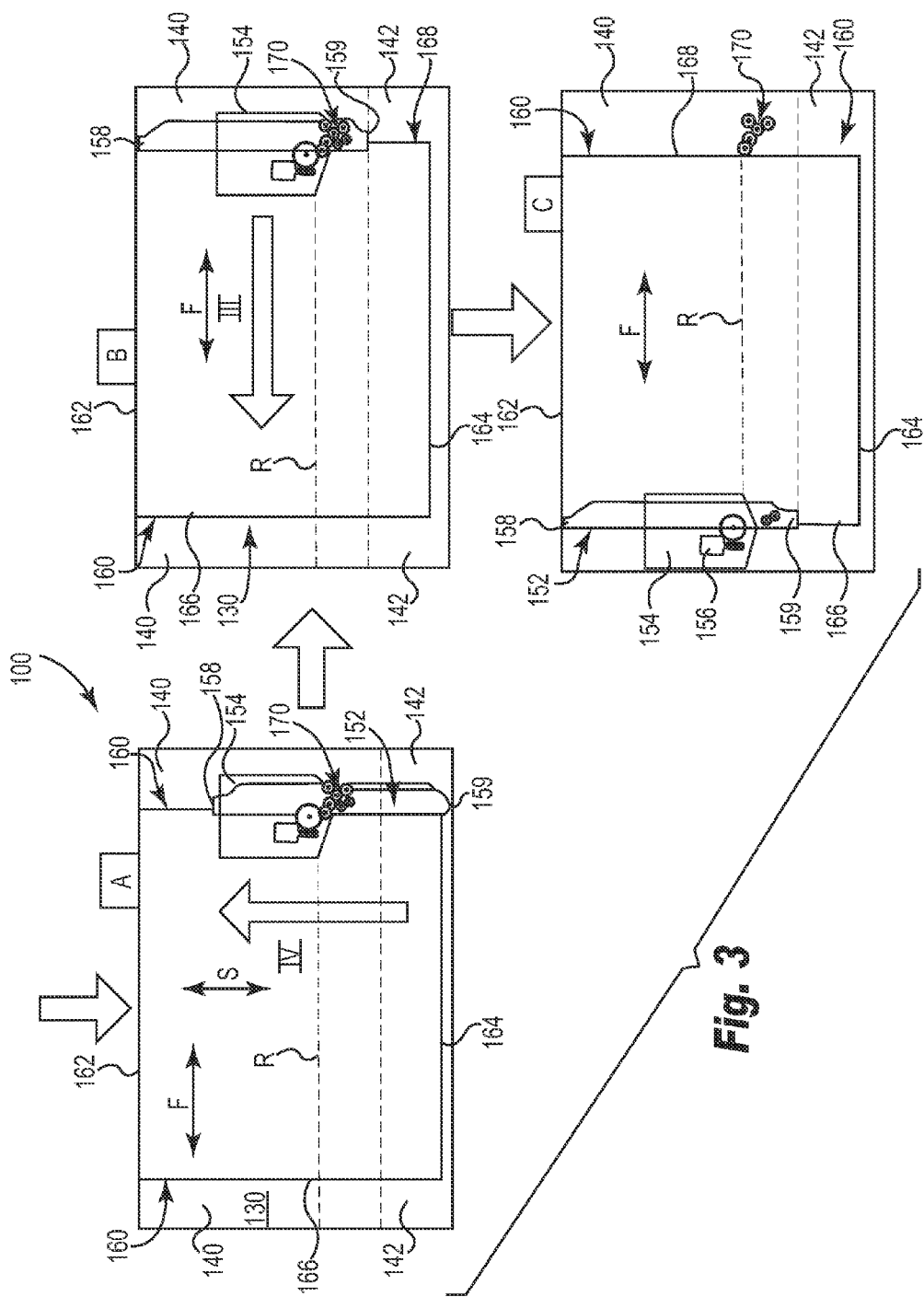
FIG. 3 is a diagram schematically illustrating a series of actions in a method and system of scanning, according to an embodiment of the present disclosure.

FIG. 2 is a diagram 100 schematically illustrating a series of actions (represented in windows A, B, C, D) in a system and method of scanning, in accordance with an embodiment of the present disclosure. In one embodiment, scanner 120 includes at least substantially the same features and attributes of scanner 20 of FIG. 1A and scanner 51 of FIG. 1B. As shown in FIG. 2(A), scanner 120 includes a scan frame 130 having a first side 132, second side 134, first end 136, and second end 138. A scan surface 160 is supported by frame 130 and includes a first side 162, second side 164, first end 166, and second end 168. The scan surface 160 is a generally transparent element and includes a first portion 140 and second portion 142, separated by dashed line 141. As noted above in association with FIG. 1A, first portion 140 has first width W1 generally corresponding to the width of a first sized document, such as a US Letter or A-sized document. The second portion 142 represents the extra width associated with oversized documents that have a width (W3 in FIG. 1A) corresponding to the combined width of the first and second portions 140, 142.

Of course, it will be understood that the principles of the present disclosure are applicable to scanning documents having a width greater than the width (W1 in FIG. 1A) of first portion 40 but less than the full width (W3 in FIG. 1A) of scan surface 160 between first and second sides 162, 164.

As further shown in FIG. 2(A), scanner 120 includes a scan module 150. It will be generally understood that the scan module 150 is located underneath the generally transparent scan surface 160 and, therefore, the scan module 150 is generally visible through the transparent scan surface 160. Accordingly, while some embodiments include opaque components arranged to support the transparent scan surface 160 in a vertically spaced position above the scan module 150, for illustrative purposes such opaque components are omitted from FIGS. 2(A-D) and FIGS. 3(A-C) to better illustrate the different positions of the scan module 150 relative to the scan surface 160.

In one embodiment, as shown in FIG. 4, the scan module 150 includes a scanning element 152, carriage element 154, and a motor and gear assembly 156. The scanning element 152 includes a first end 158 and an opposite, second end 159. The scanning element 152 is mounted on the carriage element 154 and aligned so that a length of the scanning element 152 (extending between ends 158, 159) is aligned generally perpendicular to a first orientation (represented by bidirectional arrow F). In one aspect, as will be further illustrated and described in at least FIGS. 2(B)-2(C) and described below, the scanning element 152 is selectively slidable relative to the carriage element 154. In FIG. 2(A), scanning element 152 is shown in a first position in which the first end 158 is adjacent the first side 162 of scan surface 160 and the second end 159 is adjacent the line 141 that identifies the outer edge of first portion 142.

In one embodiment, as further shown in FIG. 4, the motor and gear assembly 156 includes a motor 200 having a rotary shaft 202 and a worm wheel 210. In one aspect, the motor and gear assembly 156 is configured to cause selective movement of scanning element 152 along the first orientation via worm wheel 210 (driven by motor 200) engaging a gear rail schematically represented via line R (such as gear rail 215 shown in FIG. 4) extending along the first orientation. In other embodiments, in place of a gear rail, the frame of the scanner 120 includes an elongate recess or trench to guide translation of the carriage element 154 in the first orientation in a manner familiar to those skilled in the art.

Equipped in this fashion, the scanning element 152 scans a media or document on scan surface 160 via selective movement of the scanning element 152 in a first direction (as represented by directional arrow I) along a length of a document along the first orientation (bidirectional arrow F) from first end 166 to second end 168 of scan surface 160. In other words, the scanning is performed in the first orientation generally perpendicular to the width (extending between first side 162 and second side 164) of scan surface 160. Upon completion of this movement, the scanning element 152 becomes positioned adjacent second end 168 of scan surface 160 as shown in FIG. 2(B) and a portion of a document or media corresponding to first portion 140 of scan surface 160 has been imaged as a first width portion of the media.

Prior to continuing with the description of the scanning operation, this present disclosure will further describe components of the scan module and the components with which it interacts during the scanning operation.

In one embodiment, as illustrated in at least FIGS. 4-5, scan module 150 also includes a swing gear assembly 230 including an anchor gear 232 and a swing gear 234 that is movable into multiple positions via pivoting relative to anchor gear 232. As best seen in FIG. 5, swing gear 234 is pivotable into at least a first position 234A, a second position 234B, and a third position 234C. The swing gear 234 is connected to the anchor gear 232 via an arm 235 or other element that enables swing gear 234 to selectively pivot relative to anchor gear 232 upon initiation by controller 58 (FIG. 1B). In some embodiments, swing gear assembly 230 is considered to be a part of motor and gear assembly 156 while in other embodiments, swing gear assembly 230 is not part of motor and gear assembly 156.

In one embodiment, scanning module 150 includes a pair of gear rails 220, 222 mounted on the scanning element 152 and facing each other. In one aspect, the gear rails 220, 222 are generally parallel to a length of the scanning element 152, generally parallel to each other, and generally parallel to the entire width (extending between first side 162 and second side 164) of the scan surface 160. As later described in more detail in association with at least FIGS. 2(B), 3(A), and 8-14, swing gear 234 selectively engages the respective gear rails 220, 222 (one-at-a-time) to move scanning element 152 into the different illustrated positions relative to carriage element 154. Together, gear rails 220, 222 form a loop track against which swing gear 234 engages to shift the scanning element 152 laterally back-and-forth across the full width of the scan surface 160.

In another aspect, as further shown in FIGS. 2(A) and 6, scanner 120 includes a gear train assembly 170 located adjacent second end 168 of scan surface 160 with gear train assembly 170 being stationary and configured to releasably engage motor and gear assembly 156 of scan module 150. In one aspect, gear train assembly 170 is motorless as it relies on tapping power from motor and gear assembly 156 in order to drive other gears. While the gear train assembly 170 can include a variety of gears in different sizes and combinations, in one embodiment gear train assembly 170 as shown in FIG. 6 includes a combo gear 172, locking gear 174, and intermediate gears 176A, 176B, 176C. The combo gear 172 is positioned and configured to releasably engage worm wheel 210 (FIG. 4) to tap driving power from motor 200. The combo gear 172 transfers the power via intermediate gears 176A-176C to swing gear assembly 230, which in turn, drives gear rails 220, 222 (one-at-a-time) to thereby move scanning element 152 into different positions across the width of the scan surface 160.

In order to provide scanning of the second width portion of the media, generally corresponding to second portion 142 of scan surface 160, the scanning element 152 will be laterally shifted in the first direction (represented by arrow II in FIG. 2(B)) along the second orientation (represented by bidirectional arrow S) to a second position shown in FIG. 2C in which the second end 159 is adjacent the second side 164 of scan surface 160 and the first end 158 of scanning element 152 is located within first portion 142. In one embodiment, the scanning element 152 will travel about 3 inches to position at least a portion of the scanning element 152 to extend over the second portion 142. To cause lateral shifting of scanning element 152, motor and gear assembly 156 releasably engages gear train assembly 170.

In particular, as shown in FIG. 7, upon the scanning element 152 arriving at second end 168 of scan surface 160, the motor and gear assembly 156 releasably engages the gear train assembly 170 so that power from motor 200 is transferred (via worm wheel 210 and combo gear 172) to gear train assembly 170. Next, swing gear assembly 230 is activated to pivot swing gear 234 relative to anchor gear 232 from its first position (234A in FIG. 5) to a second position (234B in FIG. 5) in which swing gear 234 releasably engages a first end 223A of first gear rail 220 of scanning element 152, as shown in FIG. 8. Upon such engagement, when driven via motor 200 and gear train assembly 170, swing gear 234 rotates to engage and drive first gear rail 220 and thereby cause translation (as represented by directional arrow D) of scanning element 152 relative to the carriage element 154 in the second orientation (S in FIG. 2(A)) which is generally perpendicular to the first orientation (arrow F). After completion of this movement, scanning element 152 arrives in the second position shown in FIG. 9 and FIG. 2(C) in which second end 159 of scanning element 152 becomes positioned adjacent second side 164 of scan surface 160.

After completion of this lateral shift of scanning element 152 in the second orientation, as best seen in FIG. 9, swing gear 234 disengages from second end 223B of first gear rail 220 via pivoting to its first position (234A in FIG. 5). Next, locking teeth 178 are activated to engage locking gear 174, which thereby locks gear train assembly 170 relative to frame 130, as shown in FIGS. 9 and 10B.

With gear train assembly 170 locked into a static position, motor and gear assembly 156 are freed to cause translation of scan module 150 (including carriage element 154 and scanning element 152) in the second direction (represented by arrow III) along the first orientation from second end 168 to first end 166 of scan surface 160. In this embodiment, no scanning occurs during this translation from second end 168 to first end 166 of scan surface 160.

Upon completion of this translation, scan module 150 takes the position shown in FIG. 2D in which scanning element 152 is adjacent first end 166 of scan surface 160. In this position, as shown in FIG. 11, swing gear 234 is in a neutral position, and motor and gear assembly 156 are not engaged to gear train assembly 170, which remained adjacent the second end 168 of scan surface 160.

Starting from this position, a second scan is initiated while scan module 150 moves (as represented via directional arrow I) along the first orientation (F) from first end 166 to second end 168 of scan surface 160. With this action, scanning element 152 scans at least second portion 142 of scan surface 160. In one aspect, this second scanning path is non-duplicative in that it does not simply replicate the same scanning path as the first scanning path. At the completion of the scanning pass in the first orientation, scan module 150 arrives at second end 168 of scan surface 160 as shown in FIG. 3(A) with swing gear 234 in a neutral position.

In other embodiments, scanning is performed over portion 142 of scan surface 160 during movement of scanning element from the second end 168 to the first end 166 of scan surface 160 and then as scanning element 152 returns over portion 142 from the first end 166 to the second end 168, no scanning is performed.

Figure 14:
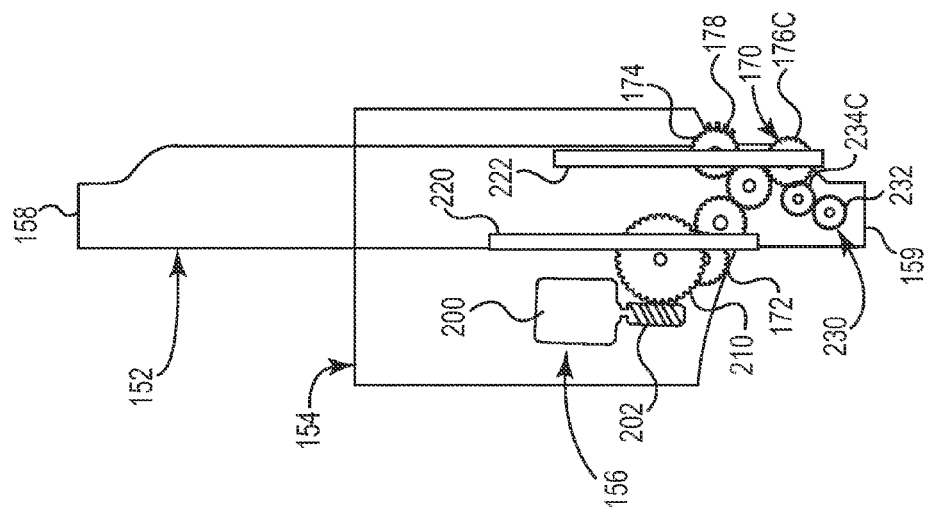
FIG. 14 is a top plan view schematically illustrating a scanning element of a scan module in a first position relative to a carriage element, and schematically illustrating a motor and gear assembly of the scan module engaged with a gear train assembly, according to an embodiment of the present disclosure.
Figure 13:
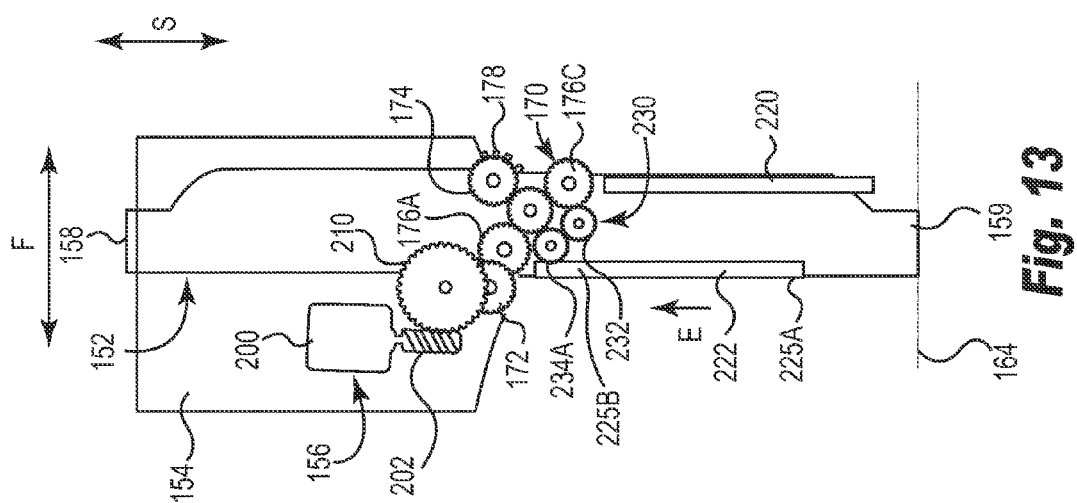
FIG. 13 is a top plan view schematically illustrating a scanning element of a scan module in a second position relative to a carriage element and a swing gear engaged with a second gear rail of the scanning element, according to an embodiment of the present disclosure.

When scanning element 152 and scan module 150 are in the position shown in FIG. 3(A) after completion of the second scanning path, motor and gear assembly 156 re-engages gear train assembly 170 in the manner described above in relation to FIG. 2(B) and FIGS. 7-8 but with swing gear 234 in a neutral position as further shown in FIG. 12. Next, the locking gear 174 becomes disengaged from locking element 178 in the manner shown in FIG. 10A, and swing gear 234 moves into engagement with first end 225A of second gear rail 222, as shown in FIG. 13. With second gear rail 222 so engaged, motor and gear assembly 156 drives swing gear 234 (via gear train assembly 170 as described above) to cause translation of second gear rail 222 (as represented by directional arrow E in FIG. 13) and of scanning element 152 (in a second direction IV in FIG. 3(A)) along the second orientation from second side 164 to first side 162 of scan surface 160. Upon completion of this action, scanning element 152 has been laterally shifted in the second orientation so that first end 158 of scanning element 152 becomes positioned adjacent first side 162 of scan surface 160 as shown in FIG. 3(B). In addition, upon completion of this action, swing gear 234 is disengaged relative to second gear rail 222, as shown in FIG. 14, and locking gear 174 engages locking element 178 (FIG. 10B) to secure gear train assembly 170 in a static position.

Next, as represented via directional arrow III in FIG. 3(B), scan module 150 is translated in a second direction along the first orientation without scanning from second end 168 to first end 166 of scan surface 160 until scan module 150 returns to its home position adjacent first end 166 of scan surface 160 and with first end 158 of scanning element 152 adjacent first side 162 of scan surface 160, as shown in FIG. 3C.

After this completion of the first and second scanning paths over first portion 140 and second portion 142, respectively, controller 59 (FIG. 1B) acts to automatically stitch together scanned images of the first and second portions 140, 142 to form a single composite image corresponding to the oversized media on scan surface 160.

In some embodiments, a width of the first width portion of a media (scanned in a first scanning path) and a width of the second width portion (scanned in a second scanning path) are generally equal to each other. For example, when the scanning element 152 moves through the first scanning path from the first end 166 to second end 168 of scan surface 160, just one-half of the entire width of scan surface 160 is scanned to form a first image portion. The second image portion is formed via the second scanning path covering the other one-half of the entire width of scan surface 160. The two image portions are automatically stitched together. In one aspect, this arrangement produces more efficient scanning as it reduces the amount of memory consumed and the total time used to scan, as compared to embodiments in which a first scanning path has a width corresponding to the entire length of the scanning element and the second scanning path has a substantially smaller width.

Figure 15:
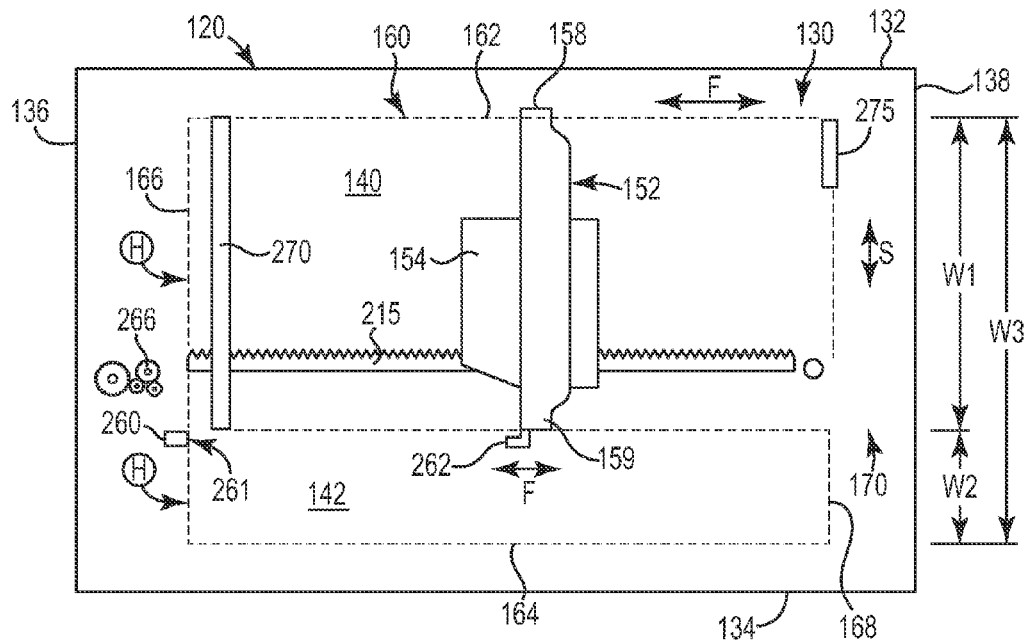
FIG. 15 is a top plan view schematically illustrating a scanner including a homing mechanism and a scan module in a first position, according to an embodiment of the present disclosure.

FIG. 15 is top plan view schematically illustrating a homing mechanism 261 of a scan module 150, according to an embodiment of the present disclosure. As shown in FIG. 15, in cooperation with controller 58, homing mechanism 261 includes an electronic sensor 260 and a flag 262. The electronic sensor 260 is mounted at a home position (represented by dashed line H) corresponding to a first end 166 of scan surface 160 (shown in dashed lines). In one embodiment, sensor 260 is an optical sensor configured to visually detect a presence of flag 262. In other embodiments, sensor 260 is configured to detect a presence of flag 262 using other means, such as magnetism, with flag 262 having a magnetic component to be detectable by the sensor 260.

In one aspect, sensor 260 is electrically connected to an input/output port of the controller 58 and controller 58 performs regular queries to determine the state of sensor 260, as will be described in more detail in association with the method described in association with FIG. 17.

As further shown in FIG. 15, scanner 120 includes a gear train assembly 170 (as previously described in association with FIGS. 2(A)-14) adjacent second end 168 of scan surface 160 and a gear train assembly 266 adjacent first end 166 of scan surface 160. Because there is a gear train assembly 266 at first end 166 of the scan surface 160 for coupling with a gear assembly of an automatic document feeder, scanner 120 omits a hard wall at first end 166 of scan surface 160. Likewise, with gear train assembly 170 at the other second end 168 of scan surface 160, a hard wall also is not placed at second end 168. Accordingly, because a scanner typically uses such a hard wall to establish a home position of a scan module and with no such hard wall is present in scanner 120, scanner 120 includes the homing mechanism 261 show in FIGS. 15-16.

Figure 16:
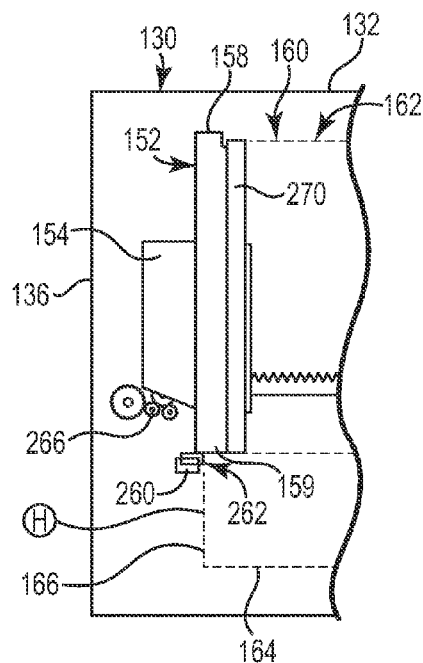
FIG. 16 is a partial top plan view schematically illustrating the homing mechanism of FIG. 15 and a scan module in a second, home position, according to an embodiment of the present disclosure.

With this in mind, sensor 260 is mounted at a location to establish a fixed reference point for the home position of scan module 150 and, via controller 58, scan module 150 is moved to the home position (H) at which flag 262 is detected in a position directly above the sensor 260. This detection confirms the arrival of scan module 150 at the home position (H), as shown in FIG. 16. Once in the home position, scanner 120 is ready to initiate a scanning operation using scan module 150.

Figures 17, 18:
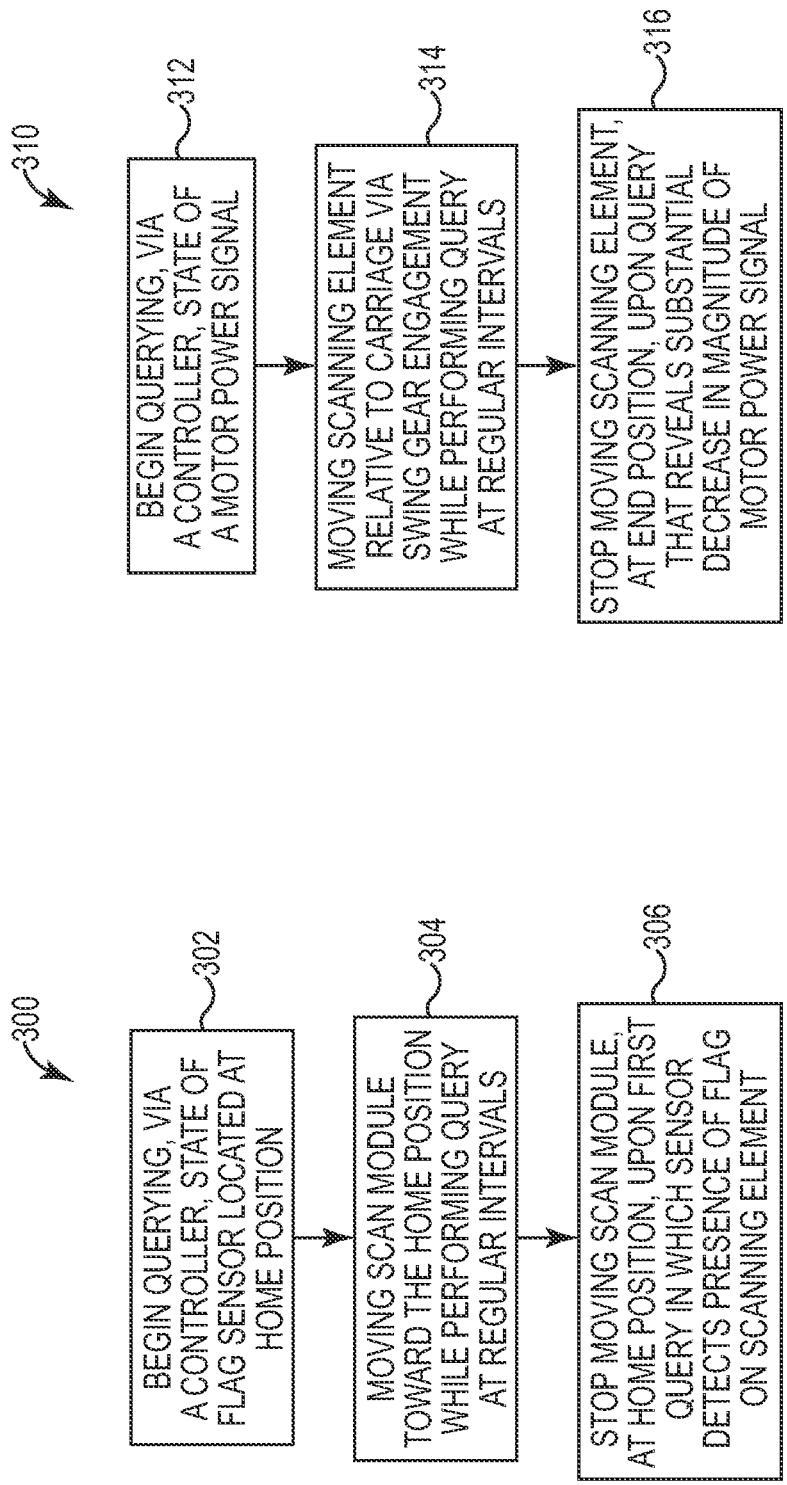
FIG. 17 is a flow diagram of a method of delivering a scan module to home position, according to an embodiment of the present disclosure.
FIG. 18 is a flow diagram of a method of stopping a scanning element at a boundary of a scan surface, according to an embodiment of the present disclosure.

Accordingly, FIG. 17 is a flow diagram 300 schematically illustrating a method of delivering the scan module 150 to its home position (H in FIG. 15), according to an embodiment of the present disclosure. As shown in FIG. 17, at 302 controller 58 (FIG. 1B) queries for a state of sensor 260 located at the home position (H). If the query reveals a positive state, then the scan module 150 is already located at the home position (H). However, if the query reveals a negative state, the scan module 150 is not at the home position (H). Accordingly, at 304, the method includes moving the scanning module 150 toward the home position (H) at the first end 166 of the scan surface 160 while the controller 58 performs, at regular intervals, the query regarding the state of the sensor 260. In one embodiment, the query is performed every 2 milliseconds during slow movement of the scan module 150 along the first orientation toward first end 166 of scan surface 160. In one embodiment, the query is performed via a call-back function of the controller 58, such as the occurrence of every interrupt service routine (ISR) of the motor 200 (FIG. 15).

At 306, the method stops moving the scan module at the home position (H) upon the first query that reveals a positive state of the sensor, indicating that the sensor 260 detects the presence of the flag 262 on scanning element 152 of sensor module 150.

Once scan module has been delivered to the home position (H) as described above, then further initialization procedures are performed which use the home position in relation to other landmarks, such as a reference strips, notches, etc. on the frame to increase the accuracy of the scanning operations.

Figure 19:
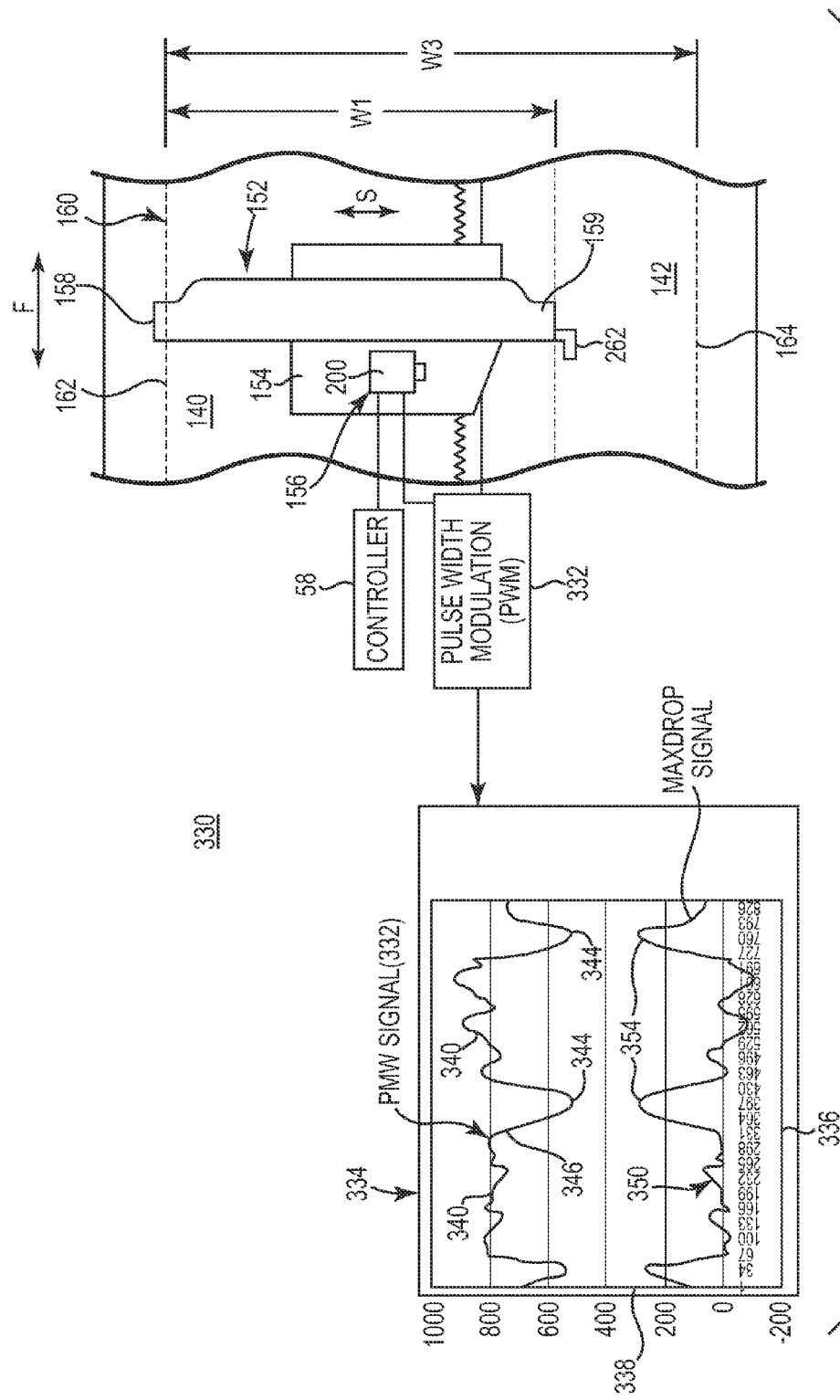
FIG. 19 is a diagram illustrating a graph of a motor power signal associated with a scan module, which is shown in a partial top plan view, according to an embodiment of the present disclosure.
Figure 20:
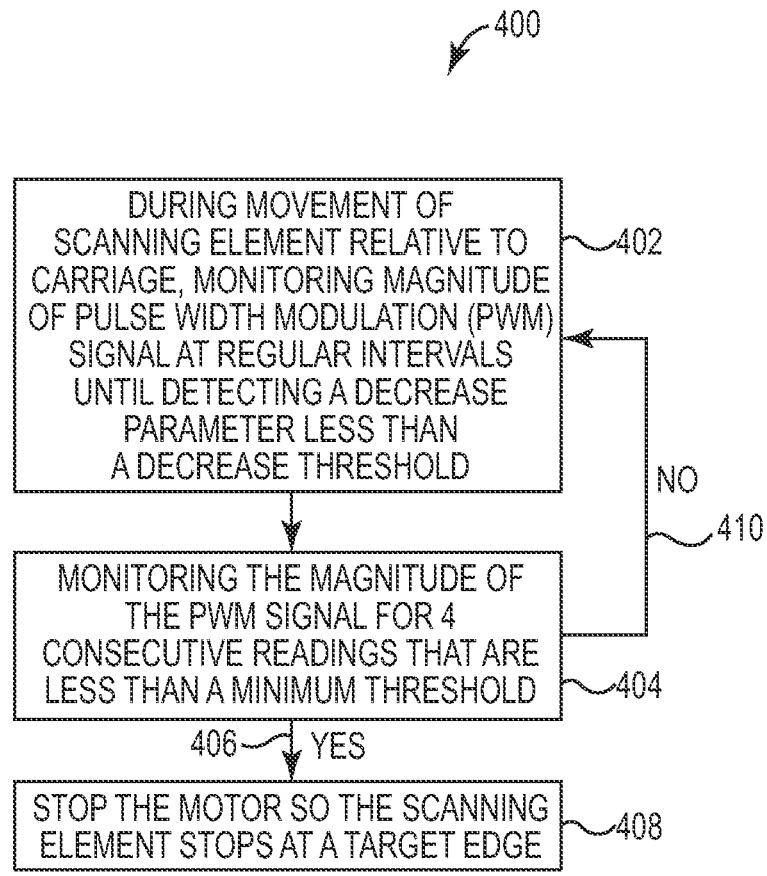
FIG. 20 is a flow diagram of a method of monitoring a motor power signal in order to stop a scanning element at a boundary of a scan surface, according to an embodiment of the present disclosure.

As shown in FIGS. 18-20, methods according to embodiments of the present disclosure act to identify an edge of the scan surface 160 (at each of the respective first and second sides 162, 164) to control a position of a scan module 150 (or its scanning element 152) without employing any additional position sensors at such edges.

As shown in FIG. 18, method 310 begins with a query, via controller 58 (FIG. 1A), regarding the state of a motor power signal for motor 200 of scan module 150 during a lateral shifting operation in which scanning element 152 is moved along the second orientation between the first and second scanning paths. Prior to describing further aspects of method 300, more information is provided in association with FIG. 19 regarding the motor power signal of motor 200 and its relationship to the lateral shifting operations of scanning element 152.

Accordingly, FIG. 19 is a diagram 330 including a partial view of scan module 150 and including a graph 332 of the state of a motor power signal during lateral shifting operations of scanning element 152 between first side 162 and second side 164 of scan surface 160. As shown in FIG. 19, in one embodiment, the motor power signal associated with scan module 150 comprises a pulse width modulation (PWM) signal 332 and the PWM signal 332 reflects the relative amount of torque and/or load borne by the motor 200 during operations using scan module 150, such as during engagement and disengagement of the swing gear 234 relative to the gear rails 220, 222.

For example, as described previously in connection with FIGS. 2(B)-2(C), 8-9, and 12-13, upon arrival of scanning element 152 at first side 162 or at second side 164 of scan surface 160 from travel along the second orientation during a lateral shifting operation, a swing gear 234 disengages from a respective gear rail 220, 222 of scanning element 152. This action terminates the lateral shifting operations to prepare the scan module 150 for travel along the first orientation (F).

Upon the onset of disengagement of the swing gear 234 relative to a gear rail 220, 222 (see, for example, FIGS. 8-9 and 12-13), an abrupt and substantial decrease in the magnitude of the PWM signal 334 occurs and these changes are represented in graph 332 of FIG. 19. In particular, graph 332 maps a magnitude (y-axis 338) of a PWM signal 332 and of a MaxDrop signal 350 over time (x-axis 336) as a scanning element 152 shifts laterally back-and-forth, along the second orientation, between the first side 162 and second side 164 of scan surface 160 (FIGS. 8-9 and 12-13).

As further shown in graph 334 of FIG. 19, portion 340 of signal 332 corresponds to a period when scanning element 152 is moving between, and at an intermediate location between, first side 162 and second side 164 of scan surface 160. During this period, portion 340 of signal 334 reflects a generally steady level of load borne by motor 200. However, portion 346 of signal 332 corresponds to a period when swing gear 234 is disengaging from one of the gear rails 220,222 on scanning element 152 when the scanning element 152 reaches first side 162 or second side 164 of scan surface 160. As seen in graph 334, in portion 346 signal 332 experiences a substantial decrease in magnitude which culminates in a minimum magnitude at 344 where the signal bottoms out. It is at this point, that the swing gear 234 becomes completely disengaged from the gear rails 220, 222 of scanning element 152.

Graph 334 also depicts a MaxDrop signal 350 which tracks a magnitude parameter to highlight the maximum decrease 354 in the magnitude of the pulse width modulation (PWM) signal 332. It will be apparent to those skilled in the art that the MaxDrop signal 350 generally mirrors the PWM signal 332 except depicting an inverse of the magnitude of the PWM signal 332. In one aspect, controller 58 uses the MaxDrop signal 350 in a further method of identifying a position of scanning element 152 relative to first side 162 or second side 164 of scan surface 160.

With this in mind, further reference is made again to FIG. 18 in which method 310, at 314, includes moving the scanning element 152 (relative to carriage 154) in a lateral shifting operation via engagement of swing gear 234 relative to one of the gear rails 220, 222 of scanning element 152 and, at the same time, performing queries of the state of the motor power signal 232 at regular intervals, such as, but not limited to every two milliseconds.

At 316, method 310 includes stopping movement of the scanning element 152 at the target edge (at either first side 162 or second side 164) upon one of the respective queries revealing a substantial decrease in the magnitude of the motor power signal 232, such as the decrease depicted in portion 346 of PWM signal 332 in graph 334 of FIG. 19.

In one embodiment, as shown in FIG. 20, a method 400 detects the substantial decrease identified in association with method 310 shown in FIG. 18. At 402, during movement of the scanning element 152 relative to carriage 154 (in a lateral shifting operation), controller 58 continues monitoring the PWM signal 232 at regular intervals until one of the queries detects a decrease parameter having a magnitude exceeding a decrease threshold. In one embodiment, the decrease parameter corresponds to the MaxDrop signal illustrated in graph 334 of FIG. 19 and which is based on a history of PWM values. The decrease threshold is a predetermined value corresponding to a known amount of decrease in the magnitude of the PWM signal 332 associated with the onset of disengagement of swing gear 234 relative to the gear rails 220, 222.

At 404, method 400 includes further monitoring the magnitude of the PWM signal 332 until controller 58 identifies four consecutive readings (or queries) in which the magnitude of the PWM signal 332 is less than a threshold.

If four consecutive readings less than the threshold are not detected, the flow reverts via path 410 to box 402, upon which the method 400 resumes general monitoring of the PWM signal 332 as shown in box 402.

However, if the four consecutive readings (of the magnitude of the PWM signal 332) is detected below the minimum threshold, then via path 406 method 400 includes stopping the motor to thereby stop the lateral shifting of scanning element 152 at the target edge (at first side 162 or second side 164) of scan surface 160.

In another embodiment, during start-up of the scanner 120, a method of moving the scan module 150 to the home position (H) includes additional aspects to address a situation at start-up in which the scan module 150 is undesirably located somewhere along one of the first and second scanning paths or along the lateral shifting path (between first side 162 and second side 164) instead of being located at the home position. This situation may arise when the scanner 120 abruptly loses power while the scan module 150 is moving through one of the scanning passes or moving through a lateral shift between the two scanning paths.

Figure 21:
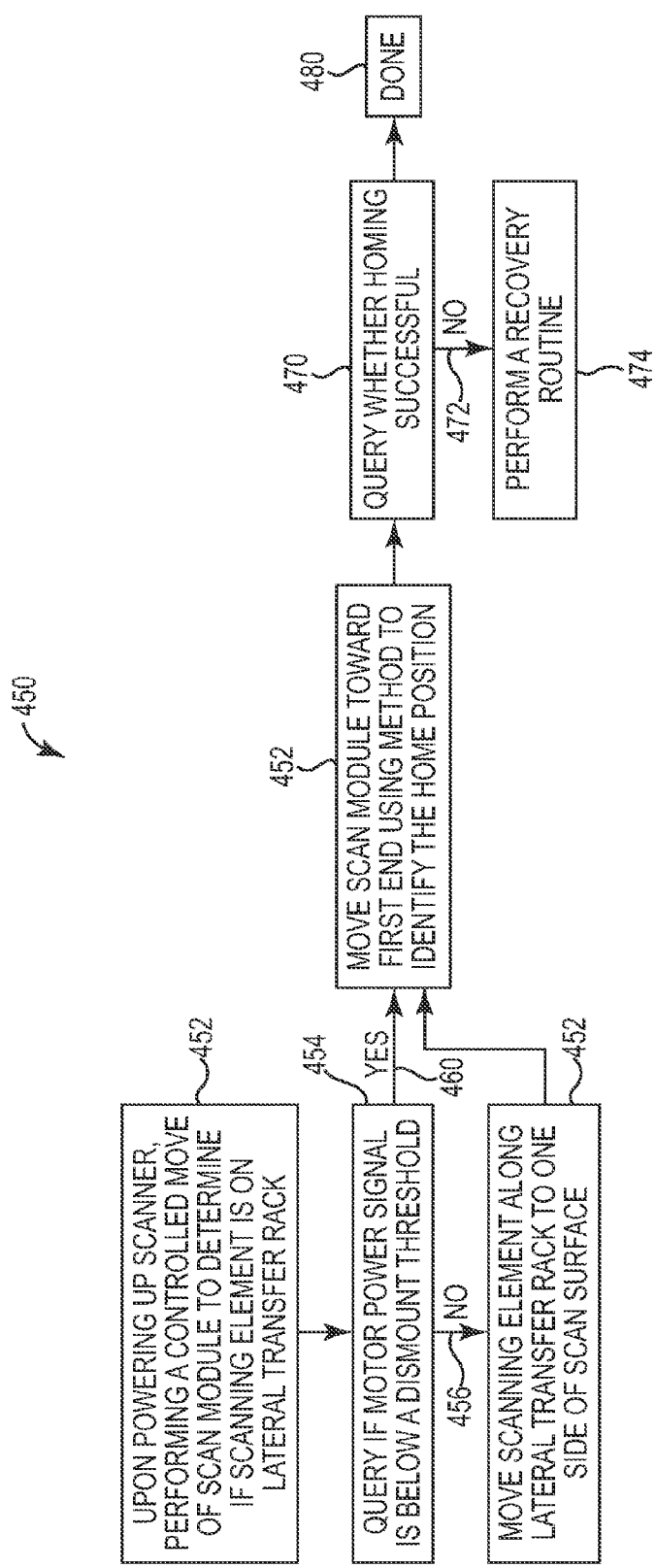
FIGS. 21-22 are flow diagrams of a method of recovering a position of scan module relative to a home position, according to an embodiment of the present disclosure.

With this in mind, FIG. 21 is a flow diagram of a method 450 of recovering a position of the scan module, according to an embodiment of the present disclosure. As shown in FIG. 21, at 452 method 450 includes, upon powering up the scanner 120, performing a controlled move of the scanning element 152 to determine if the scanning element 152 is mounted (via engagement between swing gear 234 and one of the gear rails 220, 222) for lateral shifting operations. Upon performing the controlled move, controller 58 queries the state of the motor power signal 332 (e.g. a pulse width modulation (PWM) signal) to determine if the magnitude of that signal is less than a dismount threshold. If the answer is affirmative (as represented by YES arrow at 460), then it is concluded that the scan element 152 is not engaged (by swing gear 234 via gear rails 220, 222 as in FIGS. 4, 9, 11, 12) for a lateral shifting operation. Accordingly, the scan module 150 is free to move along the first orientation (F) between the first end 166 and the second end 168 of scan surface 160.

However, if the answer to the query in box 454 is negative (as represented by NO arrow at 456), then the controller 58 concludes that the scanning element 152 is currently engaged (by swing gear 234 via gear rails 220, 220 as in FIGS. 8 and 13) for a lateral shifting operation. Accordingly, the scan module 150 is not free to move along the first orientation (F) between the first end 166 and the second end 168 of scan surface 160, and therefore, the scanning element 152 must be disengaged from the lateral shifting operation. Consequently, as shown in box 458, controller 58 causes scanning element 152 to laterally shift to one side (162 or 164) of the scan surface 160.

In the case where the query at 454 was affirmative or after completing the action in box 458, at 462 method 450 includes moving the scan module 150 toward first end 166 of scan surface 160 using the method of delivering the scan module 150 to the home position (H in FIG. 15) that was previously described in association with FIGS. 15-17. Next, at 470, a query is performed via controller 58 to determine whether the homing operation was successful. If the answer is affirmative (box 480), then the startup-homing operation is concluded. However, if the answer if negative (box 474), then controller 58 initiates a more comprehensive recovery method.

Figure 22:
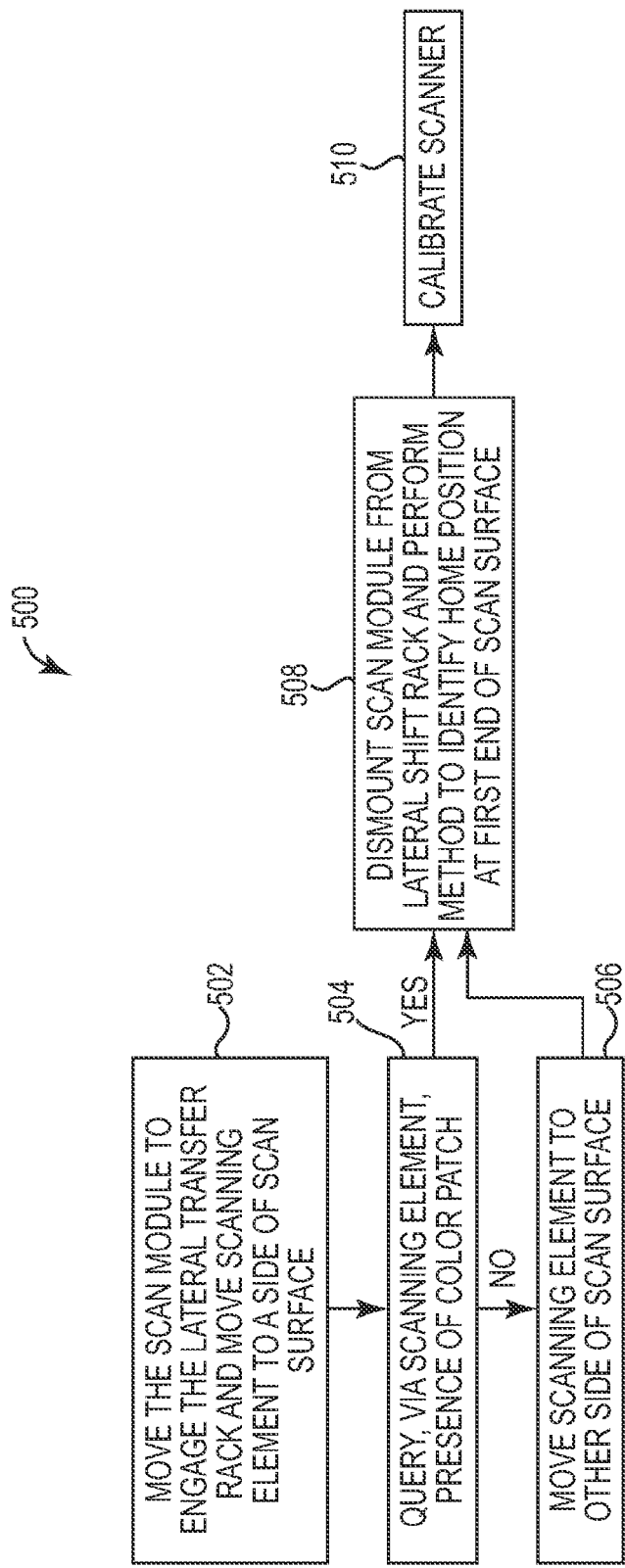

FIG. 22 is a flow diagram of a method 500 of recovering a scan module 150 to a home position upon start-up, according to an embodiment of the present disclosure, and which follows from box 474 of method 450 in FIG. 21. At 474 of method 450 in FIG. 21, it was concluded that the scanning element 152 was in the second scanning path because the homing operation in method 450 was unsuccessful in delivering the scan module 150 to the home position.

Accordingly, as shown in FIG. 22, at 502 method 500 includes moving the scan module 150 in performing a lateral shifting operation that moves the scanning element 152 from the second scanning path to the first scanning path. As previously described, one parameter identifying the scan element 152 aligned in the second scanning path includes the second end 159 of scanning element 152 being located adjacent to second side 164 of scan surface 160, as in FIGS. 2(D) and 11. Meanwhile, a parameter identifying the scan element 152 aligned in the first scanning path includes the first end 158 of scanning element 152 being located adjacent to first side 162 of scan surface 160, as in FIGS. 2A and 4. Upon completion of the lateral shifting operation of scanning element 152, controller 58 queries whether scanning element 152 detects (via scanning) a presence of a color patch, such as color patch 275 in FIG. 15.

However, if the answer to the query at 504 is negative, then at 506 method 500 includes moving the scanning element 152 to the other side of the scan surface 160, resulting in a lateral shifting operation in which scanning element 152 is shifted away from the second side 164 to the first side 162 of scan surface 160.

In the case where the query at 504 was affirmative or after completing the action in box 506, controller 58 concludes that the scanning element 152 is now aligned for travel along the first orientation in the first scanning path. Accordingly, at 508 method 500 includes dismounting the scan module 150 from the gear train assembly 170 (at second end 168 of scan surface 160) and then performing the method to deliver the scan module to the home position in a manner consistent with the homing operation as previously described in association with FIGS. 15-17.

Once the scan module 150 is confirmed to be in the home position (H in FIG. 15), at 510 method 500 includes calibrating the scanner prior to performing a scanning operation.

In another embodiment, a method of scanning includes performing a low-resolution, pre-scan to identify the dimensions of the media to be scanned. In the event that the width of the media is equal to or less than a length of the scanning element 152 as determined via edge detection techniques, the two pass scanning method need not be invoked. On the other hand, if the width of the media is greater than the length of the scanning element 152, then the two pass scanning method is invoked in the manner previously described herein.

Embodiments of the present disclosure are directed to scanning a media using a scanning element having a length less than a width of the media being scanned. In one example, the length of the scanning element is substantially less than the width of the media and scan surface. This arrangement enables scanning documents or other media of a larger category by placing the media on a stationary scan surface, and scanning the media with a standard size scanning element by making multiple scanning passes without repositioning the media. The multiple scanning passes are non-duplicative in that different width portions of the media are scanned with each separate pass. The different scanned images are automatically stitched together to form a single composite image corresponding to the media on the stationary scan surface. Accordingly, this arrangement enables using a standard sized scanning element to scan a larger media without repositioning the media during the scanning operations and without the user having to perform the stitching operation. In some instances, this automatic scanning and automatic stitching is performed independent of an external computer.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this present disclosure be limited only by the claims and the equivalents thereof.

What is claimed is:

1. A method of scanning comprising:
providing a scan module having a first width;
providing a stationary scan surface having a second width substantially greater than the first width and that is configured to maintain a media in a fixed position while automatically performing:
   performing separate scans of the media, via the scan module, along a first orientation generally perpendicular to the second width without repositioning the media;
   positioning the scan module, between the separate scans, in a second orientation generally parallel to the second width while identifying opposite edges of the scan surface along the second orientation based on information regarding disengagement of the scan module relative to a gear portion of a frame and stopping the positioning at one of the identified respective opposite edges; and
   forming a composite image of the media via stitching together the scanned portions of the media.

2. The method of claim 1, wherein the performing, the positioning, and the forming occur independent of an external computer.

3. The method of claim 1, wherein performing separate scans of the media includes:
performing a first scanning pass over a first width portion of the media; and
performing a second scanning pass over a second width portion of the media.

4. The method of claim 3, wherein the first width portion is generally equal to the first width of the scan module.

5. A method of scanning comprising:
providing a scan module having a first width;
providing a stationary scan surface having a second width substantially greater than the first width and that is configured to maintain a media in a fixed position while automatically performing:
   performing separate scans of the media, via the scan module, along a first orientation generally perpendicular to the second width without repositioning the media;
   repositioning the scan module, between the separate scans, in a second orientation generally parallel to the second width while identifying opposite edges of the scan surface along the second orientation based on disengagement of the scan module relative to a gear portion of a frame, wherein repositioning the scan module comprises laterally shifting the scan module along the second orientation via engagement of a motor and gear assembly of the scan module relative to the gear portion of the frame, and wherein identifying the opposite edges of the scan surface comprises identifying a substantial decrease in a magnitude of a power signal associated with the motor and gear assembly upon disengagement of the motor and gear assembly relative to the gear portion of the frame; and
   forming a composite image of the media via stitching together the scanned portions of the media.

6. The method of claim 5, wherein the power signal is a pulse width modulation signal.

7. A scanner comprising:
a frame including a gear assembly;
a scan surface having a first width;
a scan module having a second width substantially less than the first width the scan module includes a motor and gear assembly;

a controller configured to automatically cause two scans of a media on the scan surface, without repositioning the media, and to automatically produce a composite image of the entire media from the two scans; and a positioning system in communication with the controller and including an identification mechanism configured to identify an edge of a scanning area associated with the scan surface and to stop a position of the scan module at the identified edge, wherein the identification mechanism is configured to identify the edge of the scanning area in a second orientation generally parallel to the first width, and wherein the identification mechanism includes:

the controller configured to identify the edge of the scanning area based on a substantial change in a power signal produced by the motor and gear assembly upon disengagement of the motor and gear assembly relative to the gear assembly of a frame.

8. The scanner of claim 7, wherein the identification mechanism is configured to identify the edge without a fixed detection sensor.

* * * * *